United States Patent

[11] 3,598,160

| [72] | Inventors | Richard M. Quinn;<br>Donny W. Candioto, both of Muncie, Ind. |
|---|---|---|
| [21] | Appl. No. | 725,347 |
| [22] | Filed | Apr. 30, 1968 |
| [45] | Patented | Aug. 10, 1971 |
| [73] | Assignee | Ball Corporation<br>Muncie, Ind. |

[54] POUR CONTROL SYSTEM
11 Claims, 3 Drawing Figs.

[52] U.S. Cl. .................................................. 141/156, 250/223

[51] Int. Cl. .................................................. B65b 43/42, B67c 3/00

[50] Field of Search .......................................... 141/140, 141, 142, 143, 156, 157, 158, 159, 160, 161, 162; 307/225, 275; 310/156; 331/148; 184/6, 3; 396/103, 240; 250/219, 222, 223, 223 B; 214/11; 209/111.7, DIG. 72

[56] References Cited
UNITED STATES PATENTS

| 2,994,784 | 8/1961 | White et al. | 250/223 |
| 3,218,463 | 11/1965 | Calhoun | 250/223 B |
| 3,232,429 | 2/1966 | Norwich | 250/223 B |
| 3,358,552 | 11/1967 | Schneider | 250/223 B |
| 3,404,282 | 10/1968 | Walker | 250/222 |
| 3,040,185 | 6/1962 | Horton | 307/275 |
| 3,108,198 | 10/1963 | Lentz | 307/225 |
| 3,121,803 | 2/1964 | Watters | 307/225 |
| 3,131,315 | 4/1964 | Morwald | 307/275 |
| 3,139,532 | 6/1964 | Hjermstad | 307/225 |
| 3,165,171 | 1/1965 | Baeriswyl | 184/3 |
| 3,439,718 | 4/1969 | Wright et al. | 141/156 |

Primary Examiner—Houston S. Bell, Jr.
Attorney—Campbell and Harris

ABSTRACT: An electronic unit for accurately timewise controlling the occurrence and duration of a predetermined event—controlling the flow of liquid-state gasket material into a container lid being specifically shown. The unit includes bistable multivibrators and timewise adjustable delay circuits connected to positively control a variable device—a valve governing the flow of gasket material into a lid being shown, with the unit being actuated by a photocell sensing the presence of the lid as it is conveyed to the pouring station.

POUR CONTROL SYSTEM

BACKGROUND OF THE INVENTION

1. Field of the Invention

This invention relates to an electronic control unit, and, more particularly, relates to an electronic unit for automatically controlling a predetermined event such as controlling the flow of liquid-state gasket material to a container lid.

2. Description of the Prior Art

It is oftentimes necessary to timewise control an event such as, for example, performance of a work step in a manufacturing process. This is particularly true where the event must be timewise duration controlled as well as occurring at a predetermined time relative to an overall plan such as would be the case, for example, in an entire manufacturing process.

In the formation of a container lid which includes, as a part of the manufacturing process, pouring gasket material into the lid in liquid form, it is obviously necessary that the gasket material be controlled both as to duration of flow and the time of flow occurrence since the flow must not be commenced until the lid has reached a position to properly receive the gasket material and the flow must be maintained only until the proper amount of material has been poured to form the required gasket. Failure to properly control duration or time of occurrence of the flow of gasket material results in unsatisfactory lid production and can cause machine jamming and/or breakdown resulting in lost production.

While controlling of predetermined work steps has been heretofore attempted and devices directed to this problem have been suggested and/or utilized, and, more particularly, while devices have heretofore been suggested and/or utilized for controlling the flow of liquid-state gasket material into a container lid, these devices have not proved to be completely satisfactory due, at least in part, to a lack of complete reliability, difficulty is set up, lack of satisfactory accuracy, and/or difficulty in adjustment of timing for flow control.

SUMMARY OF THE INVENTION

This invention provides an improved electronic unit for control of an event such as a work step in a manufacturing process, and, more particularly, provides an improved electronic unit for control of the flow of liquid-state gasket material into a container lid.

It is therefore an object of this invention to provide an improved electronic unit for controlling an event such as a work step in a manufacturing process.

It is another object of this invention to provide an improved electronic unit for controlling the flow of liquid-state gasket material into a container lid.

It is another object of this invention to provide an improved electronic unit that is reliable, easily set up, accurate, and easy to timewise adjust with respect to both occurrence and duration of flow.

It is still another object of this invention to provide an improved electronic unit that automatically controls a work step both in duration and time of occurrence.

It is yet another object of this invention to provide an improved electronic unit that senses the presence of a container lid and, responsive thereto, controls the duration and occurrence of flow of liquid-state gasket material thereinto.

It is yet another object of this invention to provide an improved electronic control unit that includes bistable multivibrators and timewise adjustable delay circuits so connected as to automatically provide a timing function.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE PREFERRED EMBODIMENT

Figure 1:
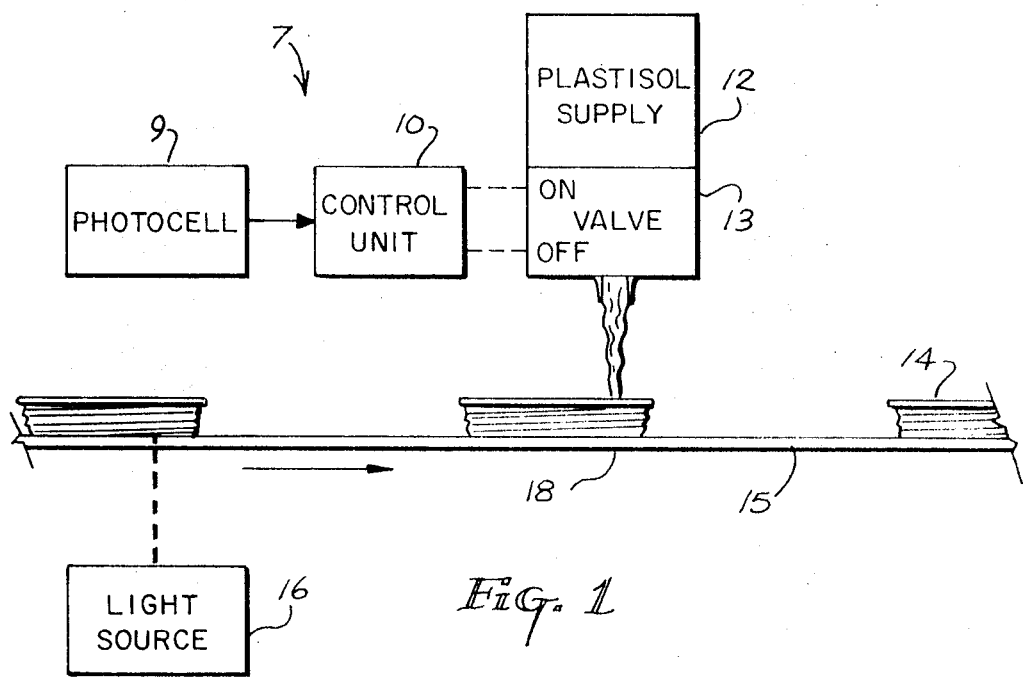
FIG. 1 is a representative diagram, partially in block, of the electronic unit of this invention shown controlling the flow of liquid-state plastisol into a container lid.

Referring now to the drawings, the numeral 7 indicates generally the electronic unit of this invention, which, as shown in FIG. 1, includes a photocell 9 and a control unit 10. Electronic unit 7 is utilized to automatically control the flow of liquid-state gasket material (indicated as plastisol in FIG. 1) from a supply source 12 through a valve 13 to container lids 14 moved to the pouring station on a conveyor 15, with the presence of the lids being sensed by photocell 9 as the lids interrupt a light beam from light source 16.

While conveyor 15 is indicated in representative form as a straight line conveyor, either conventional rotary feeder or an endless belt could be utilized, for example, and automatically driven, depending upon conditions, as would be obvious to one skilled in the art. In addition, light source 16 is conventional, as is the plastisol supply source 12 (which could be a storage reservoir, for example, mounted for gravity feed through the valve to container lids positioned beneath the nozzle of the valve), while valve 13 is preferably a conventional valve that is electronically controlled both in the opening and closing directions by separate solenoids, as is well known in the art.

As indicated in FIG. 1, after photocell 9 senses the presence of a lid 14, control unit 10 causes valve 13 to be turned on to permit plastisol from source 12 to be deposited in the lid after the lid reaches the pouring, or work, station 18 beneath the nozzle (not shown) of the valve. The delay in control unit 10 is timewise adjustable as is the duration of permitted flow through the valve, control unit 10 operating after a predetermined time period to automatically turn off the valve and thus stop the flow of gasket material.

Figure 2:
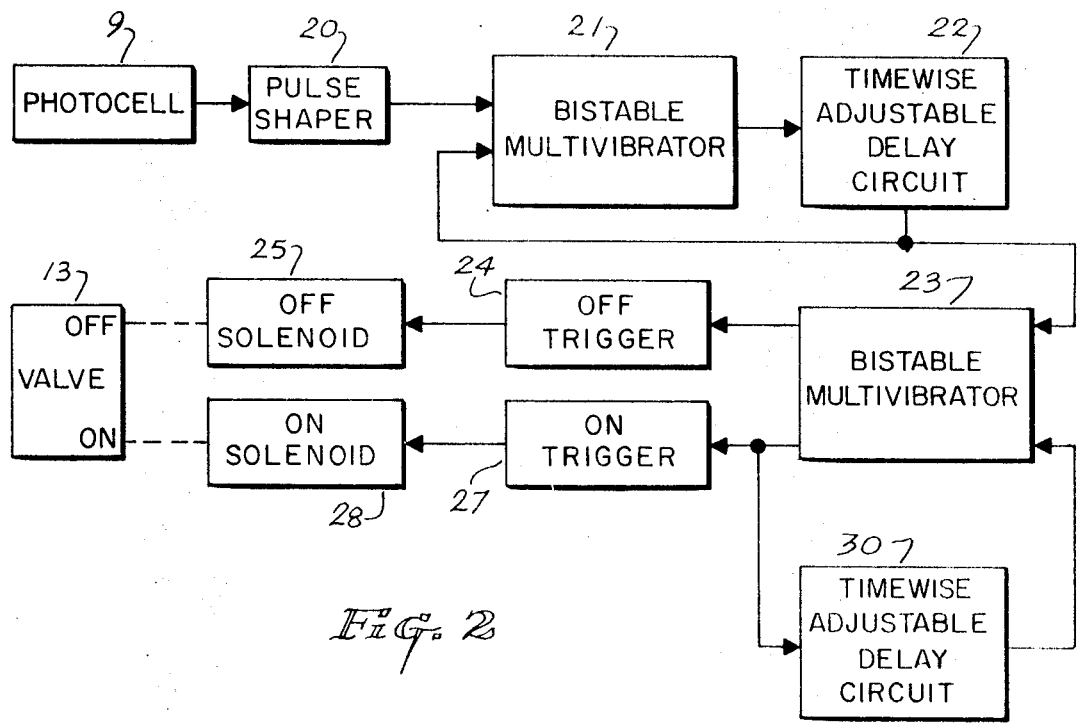
FIG. 2 is a block diagram of the electronic unit of this invention.

As shown in FIG. 2, the output from photocell 9 is coupled through a pulse shaper 20 of control unit 10 to a first bistable multivibrator 21 to change the state of the multivibrator. An output is then coupled from bistable multivibrator 21 to first delay circuit 22, the delayed output from which is coupled back to bistable multivibrator 21 to reset the multivibrator and thus cause it to reassume its original state. In addition, the delayed output from delay circuit 22 is also coupled to a second bistable multivibrator 23 to cause a change of state of this multivibrator. One output from bistable multivibrator 23 is coupled to "OFF" trigger 24 which controls "OFF" valve solenoid 25, while the other output of bistable multivibrator 23 is connected with "ON" trigger 27 which controls "ON" valve solenoid 28 (the solenoids 25 and 28 control valve 13). In addition, the output from bistable multivibrator 23 coupled to "ON" trigger 27 is also coupled to a second delay circuit 30, the delayed output from which resets multivibrator 23.

In operation, after lid presence has been sensed, delay circuit 22 prevents opening of valve 13 for a predetermined time period to allow the lid to arrive at the pour station 18. After the delay period, bistable multivibrator 23 is caused to change states which allows "ON" trigger 27 to activate "ON" valve solenoid 28 to open valve 13. Valve 13 then remains open until an output is coupled from delay circuit 30 to cause bistable multivibrator 23 to reset which allows "OFF" trigger 24 to activate "OFF" valve solenoid 25 to turn off the valve. Valve 13 then remains closed until another lid is sensed by photocell 9 to again cause the control unit 10 to function.

Figure 3:
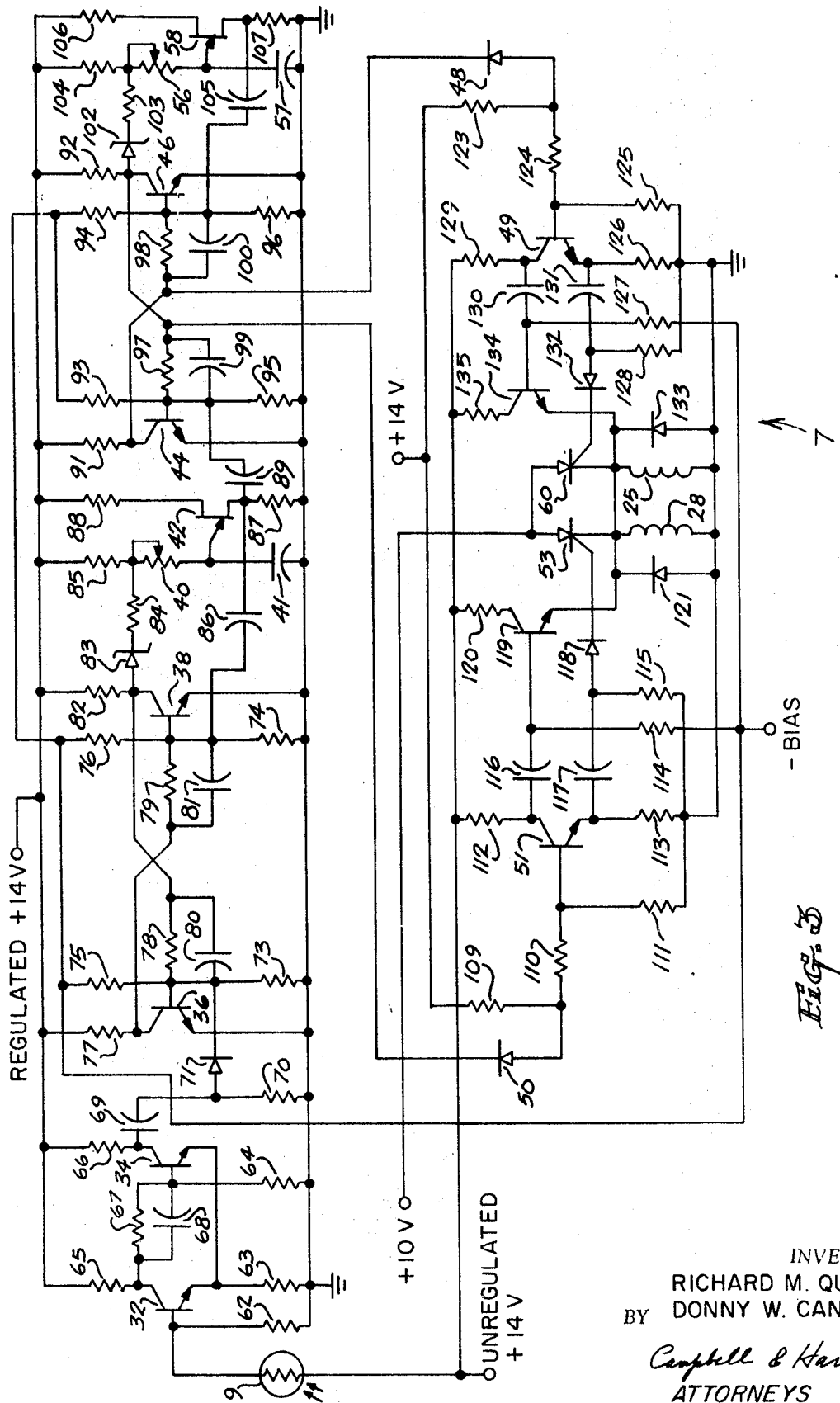
FIG. 3 is a schematic diagram of the electronic unit shown in block form in FIG. 2.

FIG. 3 is a schematic diagram of the control unit. As shown, the output from photocell 9 (which is a positive pulse occurring when lid presence is sensed) is coupled to transistor 32 of pulse shaper 20. Pulse shaper 20 is a monostable multivibrator, and the output from the multivibrator is taken from the collector of transistor 34 and coupled to the base of transistor 36 of bistable multivibrator 21. This input to transistor 36 starts conduction of this transistor (and hence is turned on) which, as is conventional, causes transistor 38 of bistable multivibrator 21 to cease conduction (and hence is turned off).

The collector of transistor 38 of bistable multivibrator 21 is connected through variable resistor 40 to charging capacitor 41, both of which form a part of delay circuit 22. Variable resistor 40 may be controlled from the front of a cabinet, for example, to enable ease of adjustment of delay time. When capacitor 41 is charged sufficiently, unijunction transistor 42 connected therewith fires and the output pulse is coupled back to the base of transistor 38 to cause bistable multivibrator 21 to reassume its original state. In addition, the output pulse from unijunction transistor 42 is coupled to the base of transistor 44 of bistable multivibrator 23 to cause transistor 44 to conduct and turn off transistor 46 of bistable multivibrator 23.

The collector of transistor 44 is connected through diode 48 to the base of transistor 49 of "OFF" trigger 24, while the collector of transistor 46 is connected through diode 50 to the base of transistor 51 of "ON" trigger 27. When transistor 46 ceases to conduct, transistor 51 starts to conduct which causes silicon-controlled rectifier 53 to fire and energizes "ON" control valve solenoid 28 to thus turn on valve 13 to cause plastisol to flow to the lid at the work station.

The collector of transistor 46 is also connected through variable resistor 56 to charging capacitor 57, both of which form a part of delay circuit 30. Like variable resistor 40, variable resistor 56 can be located at the front of a panel to provide ease of adjustment of the time duration of flow of the gasket material.

After capacitor 57 has charged sufficiently, unijunction transistor 58 fires and the output pulse therefrom is coupled back to the base of transistor 46 of bistable multivibrator 23 to cause the multivibrator to reassume its original state and causes transistor 44 to cease to conduct.

When transistor 44 ceases to conduct, this permits transistor 49 of "OFF" trigger 24 to conduct which fires silicon-controlled rectifier 60 and energizes "OFF" valve control solenoid 25 to thus turn off valve 13 and terminate the flow of plastisol to the lid at the work station.

In a working embodiment, the following components were utilized: 9—C1603al; 32, 34, 36 and 38—2N697; 40—125k ohms; 41—2 mfd.; 42—2N1671 A; 44 and 46—2N697; 48—1N458; 49—2N697; 50—1N458; 51—2N167 A; 53—C15G; 56—125k ohms; 57—2 mfd,; 58—2N1671 A; 60—C15G; 62—6.8k ohms; 63—560 ohms; 64—6.8k ohms; 65—4.7k ohms; 66—2.7k ohms; 67—15k ohms; 68—0.001; 69—0.1; 70—6.8k ohms; 71—1N458; 73 and 74—6.8k ohms; 75 and 76—15k ohms; 77—3.3k ohms; 78 and 79—6.8k ohms; 80 and 81—0.001; 82—3.3k ohms; 83—1N1508; 84—220 ohms; 85—10k ohms; 86—0.0015; 87—27 ohms; 88—270 ohms; 89—0.01; 91 and 92—3.3k ohms; 93 and 94—15k ohms; 95, 96, 97 and 98—6.8k ohms; 99 and 100—0.001; 102—1N1508; 103—220 ohms; 104—10k ohms; 105—0.0015; 106—270 ohms; 107—27 ohms; 109 and 110—2.7k ohms; 111—4.7k ohms; 112—680 ohms; 113—220 ohms; 114—10k ohms; 115—2.7k ohms; 116—0.47; 117—1 mfd.; 118—ED3003; 119—2N1711; 120—15 ohms; 121—1N2070; 123 and 124—2.7k ohms; 125—4.7k ohms; 126—220 ohms; 127—10k ohms; 128—2.7k ohms; 129—680 ohms; 130—0.47; 131—1 mfd.; 132—ED3003; 133—1N2070; 134—2N1711; and 135—15 ohms. The foregoing is, however, intended to be illustrative only of components which can be utilized and the invention is not meant to be limited thereto.

While the particular embodiment described herein is in connection with a control for pouring of gasket material, the invention could also be utilized for control of other events or work functions as would be obvious to one skilled in the art.

What we claim:

1. An electronic control unit for controlling a predetermined event with respect to an article, said unit comprising: means for sensing the presence of an article at a predetermined point and producing a signal indicating the presence of said article at said predetermined point; electrical delay means for receiving said signal and producing a second signal delayed in time with respect to said signal; a bistable multivibrator for receiving said second signal and changing from a first state to a second state in response thereto; first circuit means connected with said bistable multivibrator for causing said predetermined event to commence when said bistable multivibrator changes from said first state to said second state; means connected with said bistable multivibrator to cause said bistable multivibrator to reassume its first state after a predetermined period of time; and second circuit means connected with said bistable multivibrator for causing termination of said predetermined event when said bistable multivibrator reassumes its first state.

2. The electronic control circuit of claim 1 wherein said unit controls the flow of gasket material through a valve into a container lid, said first circuit means opening said valve and said second circuit means closing said valve.

3. The electronic control unit of claim 1 wherein said means for sensing article presence and producing an indication thereof includes a photocell, a pulse shaper, and a second bistable multivibrator connected to develop an output signal indication of article presence, which output signal is coupled to said delay means.

4. The electronic control unit of claim 1 wherein said means connected with said bistable multivibrator to cause said multivibrator to reassume its first state after a predetermined period of time includes a second electrical delay means for controlling the time duration of said event.

5. The electronic control unit of claim 4 wherein both said first and second delay means are timewise adjustable with said first delay means adjustably controlling time of occurrence of said event and said second delay means adjustably determining the time duration of said event.

6. The electronic control unit of claim 5 wherein each of said delay means includes a variable resistor, a charging capacitor, and a unijunction transistor, said capacitor charging through said variable resistor and discharging through said unijunction transistor.

7. The electronic control unit of claim 1 wherein said first and second circuit means each include separate trigger circuits one of which causes said event to commence and the other of which causes said event to be terminated.

8. The electronic control unit of claim 7 wherein each of said trigger circuits includes a silicon-controlled rectifier.

9. An electronic control unit for controlling the flow of gasket material through a valve into a container lid during formation of said lid, said unit comprising: means for sensing lid presence and producing an output signal indicative thereof; a bistable multivibrator for receiving said output signal indicating lid presence and changing states in response thereto; a first delay circuit connected with said bistable multivibrator and producing a delayed output signal indicative of sensed lid presence; a second bistable multivibrator connected with said first delay circuit and changing states upon receipt of said delayed output signal therefrom; first and second circuit means connected with opposite outputs of said second bistable multivibrator, said first circuit means opening said valve when said second bistable multivibrator is caused to change states by said output signal from said first delay circuit, and said second circuit means closing said valve when said second bistable multivibrator reassumes its original state; and a second delay circuit connected to the junction of the output of said second bistable multivibrator and said first circuit means to cause said second bistable multivibrator to reassume its original state after a predetermined period of time determined by said second delay circuit.

10. An electronic unit for controlling the flow of gasket material from a valve into a container lid at a pour station during formation of said lid, said lid being conveyed to said pour station on a conveyor, said unit comprising: a light source; a photocell positioned with respect to said light source and said lid conveyor so that said photocell senses the presence of a container lid being conveyed to said pour station; a pulse shaper for receiving an output signal from said photocell indicating container lid presence on said conveyor; a first bistable multivibrator connected to receive the output from said pulse shaper and responsive thereto changing state; a first delay circuit connected with said first bistable multivibrator and receiving the output therefrom when said bistable multivibrator is caused to change state; means connecting the output of said delay circuit to said first bistable multivibrator to cause said first bistable multivibrator to reassume its original state after a predetermined period of time determined by said first delay circuit; a second bistable multivibrator connected to receive the output from said first delay circuit and changing from a first to a second state in response thereto; an ON trigger circuit connected with said second bistable multivibrator and receiving an output therefrom when said second bistable multivibrator is in said second state; an OFF trigger circuit connected with said second bistable multivibrator and receiving an output therefrom when said second bistable multivibrator is in said first state; a second delay circuit connected with said bistable multivibrator and receiving an output therefrom when said second bistable multivibrator is caused to change from said first to said second state, the output of said second delay circuit being coupled to said second bistable multivibrator to cause said second bistable multivibrator to reassume said first state after a predetermined period of time determined by said second delay circuit; an OFF solenoid connected with said OFF trigger to maintain said valve in a normally closed condition when said second bistable multivibrator is in said first state; and an ON solenoid connected with said ON trigger for opening said valve when said second bistable multivibrator is in said second state.

11. The electronic unit of claim 10 wherein each of said delay circuits includes a variable resistor, a charging capacitor, and a unijunction transistor for determining the duration of delay; and wherein each of said triggers includes a silicon-controlled rectifier for controlling energization of said solenoids.